US006532224B1

(12) United States Patent
Dailey

(10) Patent No.: US 6,532,224 B1
(45) Date of Patent: Mar. 11, 2003

(54) METHOD, SYSTEMS, AND TERMINALS FOR ASSIGNING CONTROL CHANNEL TIME SLOTS FOR GROUP AND INDIVIDUAL PAGES

(75) Inventor: Timothy E. Dailey, Forest, VA (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/307,996

(22) Filed: May 10, 1999

(51) Int. Cl.$^7$ .............................. H04B 7/212; H04Q 7/00

(52) U.S. Cl. ................... 370/337; 370/314; 370/329; 370/442

(58) Field of Search ................... 370/337, 329, 370/321, 347, 442, 311, 314; 455/434, 450, 458, 464, 509, 518, 519, 432, 456

(56) References Cited

U.S. PATENT DOCUMENTS

| 5,150,361 A | | 9/1992 | Wieczorek et al. ........ 370/95.1 |
| 5,168,575 A | | 12/1992 | Cizek et al. |
| 5,274,837 A | | 12/1993 | Childress et al. ............... 455/7 |
| 5,299,199 A | | 3/1994 | Wilson et al. ............. 370/95.3 |
| 5,345,474 A | | 9/1994 | Hoshikawa .................... 375/7 |
| 5,465,391 A | | 11/1995 | Toyryla |
| 5,475,689 A | | 12/1995 | Kay et al. |
| 5,506,837 A | | 4/1996 | Sollner et al. ................. 370/31 |
| 5,594,948 A | | 1/1997 | Talarmo et al. |
| 5,613,201 A | | 3/1997 | Alford et al. |
| 5,617,412 A | | 4/1997 | Delprat et al. ............... 370/281 |
| 5,629,940 A | * | 5/1997 | Gaskill ....................... 340/7.35 |
| 5,697,058 A | | 12/1997 | Paavonen |
| 5,774,806 A | | 6/1998 | Tayloe et al. |
| 5,797,100 A | | 8/1998 | Dettner |
| 5,822,694 A | | 10/1998 | Coombes et al. ........... 455/433 |
| 5,857,144 A | * | 1/1999 | Mangum et al. ........... 455/11.1 |
| 5,873,023 A | | 2/1999 | Phillips et al. |
| 5,930,723 A | | 7/1999 | Heiskari et al. |
| 5,970,417 A | | 10/1999 | Toyryla et al. |
| 5,987,331 A | | 11/1999 | Grube et al. |

(List continued on next page.)

FOREIGN PATENT DOCUMENTS

| EP | 0 642 287 A1 | | 3/1995 | ............ H04Q/7/38 |
| EP | 0 642 287 A1 | * | 8/1995 | ............ H04Q/7/38 |
| EP | 0 942 616 A1 | | 9/1999 | |
| GB | 2 271 690 A | | 4/1994 | ............ H04Q/7/04 |
| WO | WO 94/14289 | | 6/1994 | ............ H04Q/7/04 |
| WO | WO94/28687 | | 12/1994 | ............ H04Q/7/04 |
| WO | WO97/07604 | | 2/1997 | ............ H04B/7/26 |
| WO | WO 98/05157 A3 | | 2/1998 | ............ H04N/9/00 |
| WO | WO 98/05157 A2 | | 2/1998 | |
| WO | WO 98/05176 | | 2/1998 | |
| WO | WO 99/17581 | | 8/1999 | |

OTHER PUBLICATIONS

PCT International Search Report (copy) PCT/US 00/09551.
TR45 TIA/EIA–136–123–A Draft Text: Digital Control Channel Layer 3; Ch. 1.1.1 and 1.1.2, 5 pages (Aug. 1998).

Primary Examiner—Dwayne Bost
Assistant Examiner—Sonny Trinh
(74) Attorney, Agent, or Firm—Myers Bigel Sibley & Sajovec

(57) ABSTRACT

A method of assigning paging channels to terminals providing group communications with a communications systems includes defining a control channel including a plurality of time slots wherein the time slots are grouped into time frames so that each time frame includes a plurality of sequential time slots. A first time slot of each of the time frames is assigned as a first paging channel for one of the terminals. A second time slot of each of the time frames is assigned as a second paging channel for the terminal wherein the second time slot is assigned to provide a desired proximity of the first and second time slots within each of the time frames. Related systems and terminals are also discussed.

63 Claims, 11 Drawing Sheets

U.S. PATENT DOCUMENTS

| | | |
|---|---|---|
| 5,991,635 A | 11/1999 | Dent et al. |
| 6,026,296 A | 2/2000 | Sanders, III et al. |
| 6,111,867 A * | 8/2000 | Mann et al. ................. 370/337 |
| 6,115,613 A | 9/2000 | Jonsson |
| 6,138,011 A | 10/2000 | Sanders, III et al. |
| 6,195,415 B1 | 2/2001 | Shimoda et al. |
| 6,272,334 B1 | 8/2001 | Rao |
| 6,292,670 B1 | 9/2001 | Kauria et al. |
| 6,377,560 B1 * | 4/2002 | Dailey ........................ 370/329 |

* cited by examiner

METHOD, SYSTEMS, AND TERMINALS FOR ASSIGNING CONTROL CHANNEL TIME SLOTS FOR GROUP AND INDIVIDUAL PAGES

RELATED APPLICATIONS

This application is related to: application Ser. No. 09/309,005 entitled Methods and Systems for Providing Group Calls with Reduced Setup Times; application Ser. No. 09/309,018 entitled Methods And Systems For Providing Temporary Identification Numbers For Mobile Terminals; application Ser. No. 09/309,012 entitled Apparatus And Methods For Conducting Group Calls In Wireless Communications Systems; and application Ser. No. 09/309,022 entitled Methods, Systems, And Terminals For Providing Group Communications Over A Common Traffic Channel. Each of these applications is being filed concurrently with the present application, each of these applications has common inventorship, and each of these applications is assigned to Ericsson, Inc., the assignee of the present invention. In addition, the disclosures of each of these applications are hereby incorporated herein by reference.

FIELD OF THE INVENTION

The present invention relates to the field of communications and more particularly to radiotelephone communications methods and systems.

BACKGROUND OF THE INVENTION

Conventional cellular communications systems (such as systems operating according to the IS-136 standard) generally provide one-to-one communications from one mobile terminal to another mobile terminal or to a landline telephone coupled to a public switched telephone network. A conventional cellular communications system is illustrated in FIG. 1. This system includes a mobile switching center (MSC) 31 and a home location register 33.

The MSC is coupled to a plurality of radio base stations (RBS) 32 wherein each RBS 32 defines a cell 35. In addition, the MSC can be coupled to a public switched telephone network (PSTN) 36. As will be understood by those having skill in the art, the conventional cellular communications system of FIG. 1 can provide cellular radiotelephone communications for one or more cellular mobile terminals (MT) 37. More particularly, the cellular radiotelephone communications can be provided using conventional cellular standards wherein a telephone is dialed to place a call to another communications device.

Each RBS provides radio frequency transmit and receive functions and supports low level protocol functions. Moreover, a RBS can be considered a dumb peripheral of the MSC 31 wherein the MSC provides central intelligence for the system. Each RBS can be coupled to the MSC 31 via communications links 39. These communications links can be T1 links provided, for example, via landline or microwave. The MSC 31 provides voice path switching between two cells or a cell and the PSTN 36. The MSC 31 provides central system intelligence to control the radio base stations and to process high level protocol messages from mobile terminals 37 relayed by the radio base stations. In other words, the MSC handles call setup, paging, handoff, and call connection.

The home location register 33 keeps track of the current status of the mobile terminals. For each mobile terminal, for example, the home location register can record whether that terminal is on, off, or busy, as well as the location area (including a group of cells) within which the mobile terminal is located. The home location register can also include a database of restrictions and allowed service features for each mobile terminal. The home location register can also be considered a portion of the MSC.

The setup of a call between mobile terminals 37 using the system of FIG. 1 is illustrated in FIG. 2. As shown, the originating mobile terminal 37a issues an origination message which is received by the radio base station 32a for the cell 35a in which the mobile terminal 37a is located. The radio base station 32a checks the origination message for errors, and if no significant errors are detected, the radio base station 32a forwards the message to the mobile switching center. The mobile switching center authenticates the originating mobile terminal 37a and analyses the called number. If the originating mobile terminal and the called number are valid, the mobile switching center instructs the radio base station 32a to assign a Digital Traffic Channel (DTC) to the originating mobile terminal. Origination and channel designation messages are discussed, for example, in TR45, TIA, EIA-136-123-A Draft Text, Digital Control Channel Layer 3, Aug. 31, 1998, the disclosure of which is hereby incorporated herein in its entirety by reference.

Because the called party is another mobile terminal, the mobile switching center checks the HLR to determine the current location area (LA) for the called mobile terminal 37b if the called mobile terminal is active. A plurality of cells is assigned to a location area, and a mobile terminal updates its location with the cellular system only when the mobile terminal enters a new location area. Accordingly, location area updates are not needed every time a mobile terminal enters a new cell. While Digital Control Channel (DCCH) traffic may be reduced, pages for a called mobile terminal may need to be transmitted in all cells assigned to the location area.

The mobile switching center then issues a page message to all radio base stations supporting cells in the location area of the called mobile terminal 37b. Each of these radio base stations issues a page message on an appropriate paging subchannel. Because of the DCCH paging structure, however, a period of time as long as 1.28 seconds may pass before the page message can be issued. The page message wakes the called mobile terminal from its battery sleep mode, and the called mobile terminal 37b responds to the appropriate radio base station (now referred to as the called radio base station 32b) with a page response message to indicate the same.

The page response message is relayed from the called radio base station 32b to the mobile switching center, and the mobile switching center instructs the called radio base station 32b to assign a digital traffic channel to the called mobile terminal 37b. The mobile switching center then completes a communications path between the originating mobile terminal 37a and the called mobile terminal 37b using the two digital traffic channels.

Pages transmitted from the cellular communications system to a mobile terminal can be transmitted over a digital control channel (DCCH) as shown in FIG. 2B. For example, the page transmitted by the radio base station to the terminal 37b of FIG. 2A can be transmitted over the digital control channel of FIG. 2B. In particular, the digital control channel can be a time division multiple access (TDMA) control channel including a plurality of time slots T0 to T31 grouped into time frames so that each time frame includes a plurality of sequential time slots. According to the IS-136 standard, each super frame can include 32 time slots. Moreover, the time frames can be organized into a hyperframe structure with a primary superframe and a secondary superframe included in each hyperframe with each secondary superframe repeating the information transmitted during the preceding primary superframe. Accordingly, a mobile terminal typically has two opportunities to receive information transmitted over the digital control channel of FIG. 2B.

A page can thus be transmitted to a mobile terminal during one of the 32 time slots of the primary superframe and then retransmitted during the corresponding time slot of the secondary superframe. To save power at the mobile terminal, the mobile terminal is assigned a time slot over which pages for the mobile terminal will be transmitted. Accordingly, the mobile terminal need only monitor the assigned time slot in each superframe, and the mobile terminal receiver can be powered down during the other time slots. In the example of FIG. 2B, the mobile terminal 37 is assigned time slot T12 so that pages for the mobile terminal are transmitted during the twelfth time slot of a frame. The mobile terminal receiver can thus be turned off during time slots T0–T11 and T13–T31 of each time frame thereby reducing power consumption and increasing battery life. Moreover, if a page for the mobile terminal is correctly received during the assigned time slot of a primary superframe, the mobile terminal receiver can be turned off during the entirety of the subsequent secondary superframe.

A control channel paging time slot is typically assigned to the mobile terminal within a cell of a cellular communications system using a hashing algorithm based on a mobile identification number (MIN) for the mobile terminal. According to the IS-136 standard, this hashing algorithm is independently executed by both the mobile terminal and the radio base station for the cell so that the assignment of the time slot is not communicated between the mobile terminal and the radio base station. The hashing algorithm typically is designed to distribute mobile terminals within a cell across the time slots of a digital control channel frame for the cell thereby balancing the load on the digital control channel.

For example, a page for the mobile terminal 37 received by a radio base station from a mobile switching center may include the mobile identification number for the mobile terminal, and the radio base station can use the hashing algorithm to determine that the page should be transmitted over time slot T12. The mobile terminal knows to monitor time slot T12 based on a separate execution of the hashing algorithm. The mobile terminal can perform the hashing algorithm using the mobile identification number as well as base station specific information transmitted by the base station over a broadcast control channel (BCCH). For example, the number of slots available for paging over the digital control channel (DCCH) may vary by base station so that the number of paging time slots for the hashing algorithm may vary by base station.

The conventional cellular communications system of FIG. 1, however, may not support dispatch oriented group calls (also referred to as conference calls). Radio dispatch group communications systems are commonly used by emergency service providers such as police and/or fire departments to provide communications between a dispatcher and emergency personnel. For example, a police dispatcher can simultaneously call all on-duty police officers using a radio dispatch communications system. Alternately, a police officer can quickly establish communications with other police officers and/or dispatchers simply by pressing a push-to-talk button on his radio. Similar radio dispatch communications systems may also be used by businesses such as trucking and/or taxi businesses.

In general, radio dispatch group communications systems provide one-to-many group communications as opposed to one-to-one communications provided by conventional cellular radiotelephone communications systems. Radio dispatch group communications are also preferably provided without the call setup delays that may be common in a conventional cellular radiotelephone communications system. For example, the time required to setup a call in a conventional IS-136 cellular radiotelephone system may be as long as 6 or 7 seconds including up to 1.28 seconds just to page the receiving cellular radiotelephone. This setup time, however, may be unacceptable for police and other emergency radio dispatch group communications systems.

With the proliferation of cellular communications systems, there has been an effort to provide hybrid communications systems that can support both cellular radiotelephone communications as well as dispatch oriented group communications. Such a system has been developed, for example, by Motorola, with service being offered by Nextel. A similar system has been developed by Ericsson (the assignee of the present application) under the name DAMPS-PRO. In particular, the DAMPS-PRO product provides cellular communications according to the IS-136 cellular communications standard, as well as dispatch oriented group communications for predefined user groups.

In the DAMPS-PRO system, intelligent group communications functionality is added to an IS-136 cellular communications system as shown in FIG. 3. This intelligent group communications functionality is provided by adding a group server 41, a group bridge 43, a local area network 45, and a group database 47. The cells, mobile switching center, home location register, public switched telephone network, and radio base stations provide cellular communications as discussed above with regard to FIGS. 1 and 2.

With regard to group calls, the group bridge provides a bank of telephony equipment which can initiate and receive radiotelephone calls, provide voice prompts, and respond to user inputs. The bridge also provides a group function that sums the audio from all parties within a designated group and distributes the summed audio to all parties. The server communicates with the mobile switching center via standard telephony signaling (such as defined by the SS7 standard) and controls the operation of the bridge equipment via the local area network.

The setup for a group call according to the DAMPS-PRO system is illustrated in FIG. 4. In general, a predetermined set of mobile terminals define a group which can communicate in the group call mode. Each of these mobile terminals may have standard cellular radiotelephone functionality whereby one-to-one communications can be provided after entering a telephone number and pressing a send button. Mobile terminals in a conference group may also include a push-to-talk (PTT) button which can automatically establish a group call with other active mobile terminals in the group.

In particular, an originating mobile terminal 37a' may issue an origination message when the PTT button is pushed. The radio base station providing service to the originating mobile terminal 37a' (now referred to as the originating radio base station 32a') receives the origination message, and checks the origination message for errors. If no significant errors are detected, the origination message is forwarded to the mobile switching center. The mobile switching center authenticates the originating mobile terminal 37a' and analyses the called number therein identifying the group. If the originating mobile terminal 37a' and the identified group are valid, the mobile switching center authorizes the originating radio base station 32a' to assign a digital traffic channel to the originating mobile terminal 37a', and a conversation channel is established between the originating mobile terminal 37a' and the group bridge 43 using the assigned digital traffic channel.

Group calls are indicated by a Called party number portion of the origination message that is understood by both the mobile terminals in the group and the mobile switching center. The mobile switching center detects that the called party number is for a group call and connects the originating mobile terminal to the conference bridge. The conference server accepts the call and then searches the group database to determine the other mobile terminals in the group that should be called. The server then instructs the conference bridge to place calls to each of the other mobile terminals in the group via the mobile switching center. The call from the originating mobile terminal and the calls to each of the other mobile terminals in the group are then grouped together. In particular, the mobile switching center issues pages for each of the other mobile terminals in. the group and completes each call normally once each serving radio base station is known. As further shown in the flow diagram of FIG. 5, the steps of sending the origination message at block 81, setting up the originating side of the call at block 83, paging to locate the called mobile terminals at block 85, and setting up the terminating side of the call at block 87 proceed sequentially.

In the hybrid communications system discussed above, a hybrid terminal may need to monitor a digital control channel for individual pages identified by the mobile identification number intended for the terminal only as discussed above with regard to FIG. 2B. In addition, the hybrid terminal may need to monitor the digital control channel for group pages identified by a group identification number. The hybrid terminal may thus need to monitor two different time slots in each digital control channel frame, thereby increasing the amount of time the mobile terminal receiver is powered up during each control channel frame, increasing the power consumed, and increasing the drain on the mobile terminal battery. Accordingly, there continues to exist a need in the art for methods, systems, and terminals providing improved paging and providing reduced power consumption.

SUMMARY OF THE INVENTION

It is therefore an object of the present invention to provide improved methods, systems, and terminals for group communications.

It is another object of the present invention to provide cellular communications methods, systems, and terminals that can improve group paging.

It is another object of the present invention to provide cellular communications methods, systems, and terminals that can reduce power consumption.

It is still another object of the present invention to provide communications methods, systems, and terminals that can increase access speeds.

These and other objects can be provided according to the present invention by defining control channel including a plurality of time slots wherein the time slots are grouped into time frames so that each time frame includes a plurality of sequential time slots. A first time slot of each of the time frames is assigned as a first paging channel for one of the terminals. In addition, a second time slot of each of the time frames is assigned as a second paging channel for the terminal, wherein the second time slot is assigned to provide a desired proximity of the first and second time slots within each of the time frames. The mobile terminal receiver can thus be powered up for an interval of time during a control channel frame including the first and second time slots of the frame and powered down during the remainder of the frame. By providing the first and second time slots within the desired proximity, the interval of time over which the receiver is powered up during each frame can be reduced, thereby reducing power consumed by the mobile terminal and increasing mobile terminal battery life.

More particularly, the second time slot can be assigned to provide the second time slot within a predetermined number of time slots of the first time slot within each of the time frames. Preferably, the second time slot is assigned to be the same as the first time slot so that the mobile terminal needs to monitor only one time slot of a control channel frame. In addition, the step of assigning the second time slot can include determining whether the second time slot can be provided within a predetermined number of time slots of the first time slot, and responsive to determining that the second time slot can be provided within the predetermined number of time slots of the first time slot, assigning the second time slot within the predetermined number of time slots of the first time slot within each of the time frames. Alternately, the second time slot can be assigned so that at least a second predetermined number of time slots separates the first and second time slots within a time frame wherein the second predetermined number of time slots is greater than the first predetermined number of time slots, responsive to determining that the second time slot cannot be provided within the predetermined number of time slots of the first time slot.

A third time slot of each of the time frames can be assigned as a third paging channel for a second one of the terminals, and a fourth time slot can be assigned as a fourth paging channel for the second terminal wherein the fourth time slot is assigned to provide a desired proximity of the third and fourth time slots within each of the time frames. In addition, relative high and low priorities can be assigned to the first and second terminals respectively so that the desired proximity of the first and second time slots is given higher priority than the desired proximity of the third and fourth time slots. In other words, the assignments for the mobile terminal having the high assignment priority can be made preferentially. More particularly, the relative high priority can be assigned to a mobile terminal having a low battery charge and/or a preferred status such as a terminal for a police or fire department.

In addition, the first and second terminals can provide group communications therebetween, and the second and fourth time slots can comprise a common time slot so that the second and fourth paging channels comprises a common group paging channel. The relative high and low priorities can thus be assigned to the first and second terminals so that the desired proximity of the first time slot and the common time slot is given higher priority than the desired proximity of the third time slot and common time slot. When two mobile terminals providing group communications therebetween are in a common cell, the common time slot can thus be used to transmit group pages for the group including the first and second terminals.

More particularly, the control channel can be a digital control channel such as a time division multiple access (TDMA) digital control channel according to the IS-136 standard. Moreover, the first and second consecutive time frames can define respective primary and secondary frames such that information included in the secondary frame is the same as information included in the primary frame. The first paging channel for the terminal can be an individual paging channel for the terminal and the second paging channel can be a group paging channel for the terminal. In addition, the first time slot can be assigned based on an identification number for the terminal according to a hashing algorithm. The identification number can be, for example, a mobile identification number (MIN) according to the IS-136 standard.

The assignment of the time slots can be preceded by communicating a login message from the terminal to the communications system, and followed by communicating at least one of the first time slot assigned as the first paging channel and the second time slot assigned as the second paging channel from the communications system to the terminal. At least one of the time slots can thus be assigned independently by the radio base station servicing the cell within which the mobile terminal is located responsive to the login message and then transmitted to the respective mobile terminal. Accordingly, the radio base station can assign at least one of the time slots to provide the desired proximity/ and based on current control channel traffic without requiring a parallel calculation at the mobile terminal. Instead, the assignment is transmitted to the mobile terminal.

The methods, systems and terminals of the present invention can thus provide time slot assignments for group and individual pages for a mobile terminal to reduce power consumption and the resulting battery drain at the mobile terminal. More particularly, first and second time slots for group and individual pages can be assigned to provide a desired proximity therebetween within a control channel time frame thereby allowing the mobile terminal receiver to be powered up over a period of time including both time slots while reducing the period of time that the receiver is powered up during a time frame.

DETAILED DESCRIPTION

Figure 1:
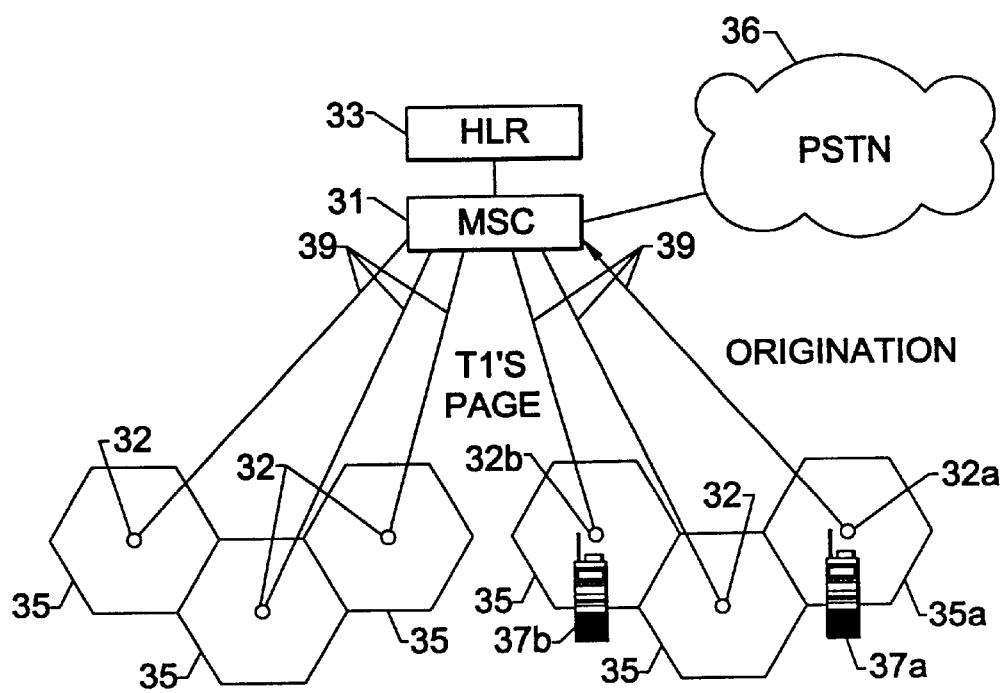
FIG. 1 is a block diagram of a cellular radiotelephone communications system according to the prior art.
Figure 2A:
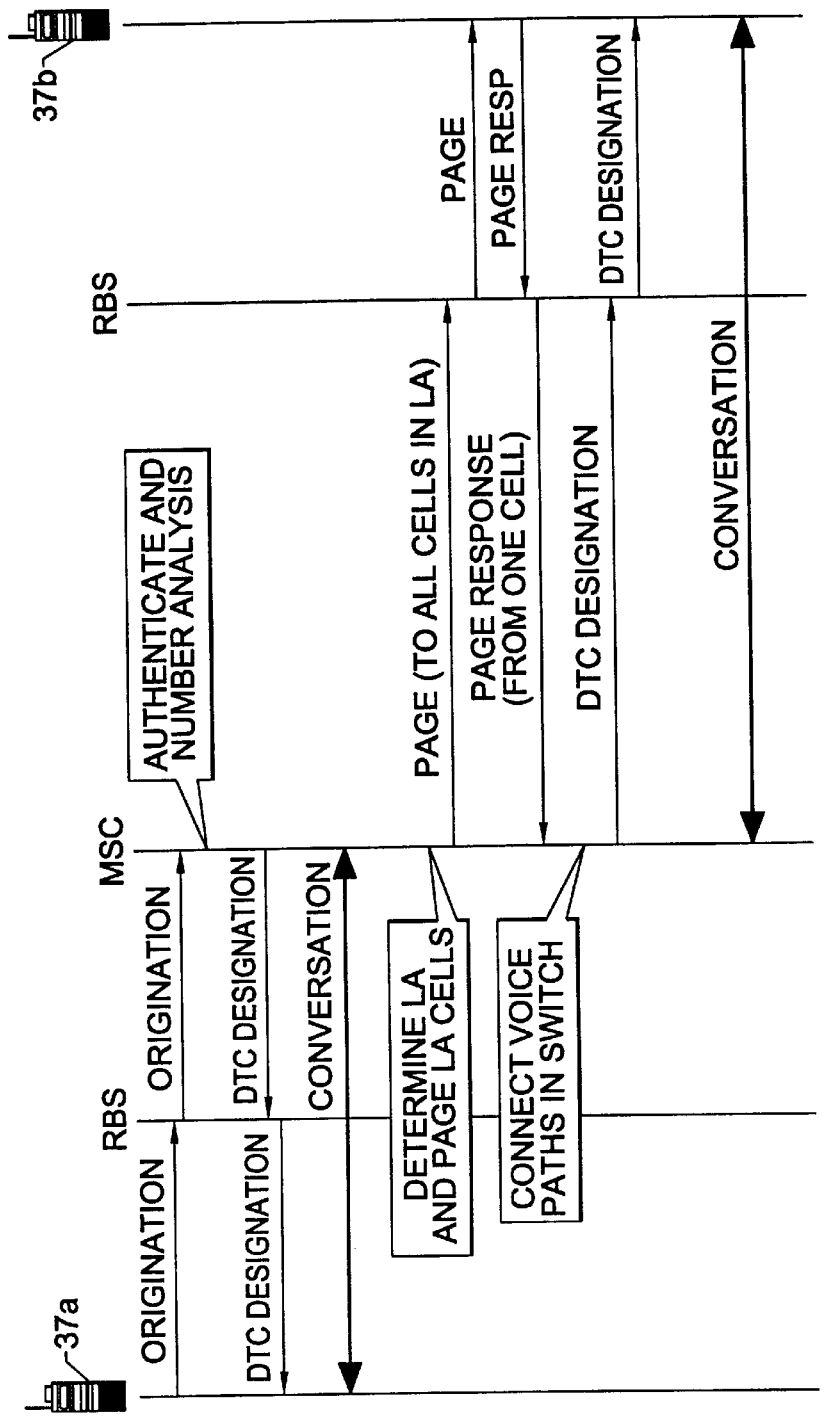
FIG. 2A is a message flow diagram illustrating steps of setting up a one-to-one radiotelephone call in the system of FIG. 1.
Figure 2B:
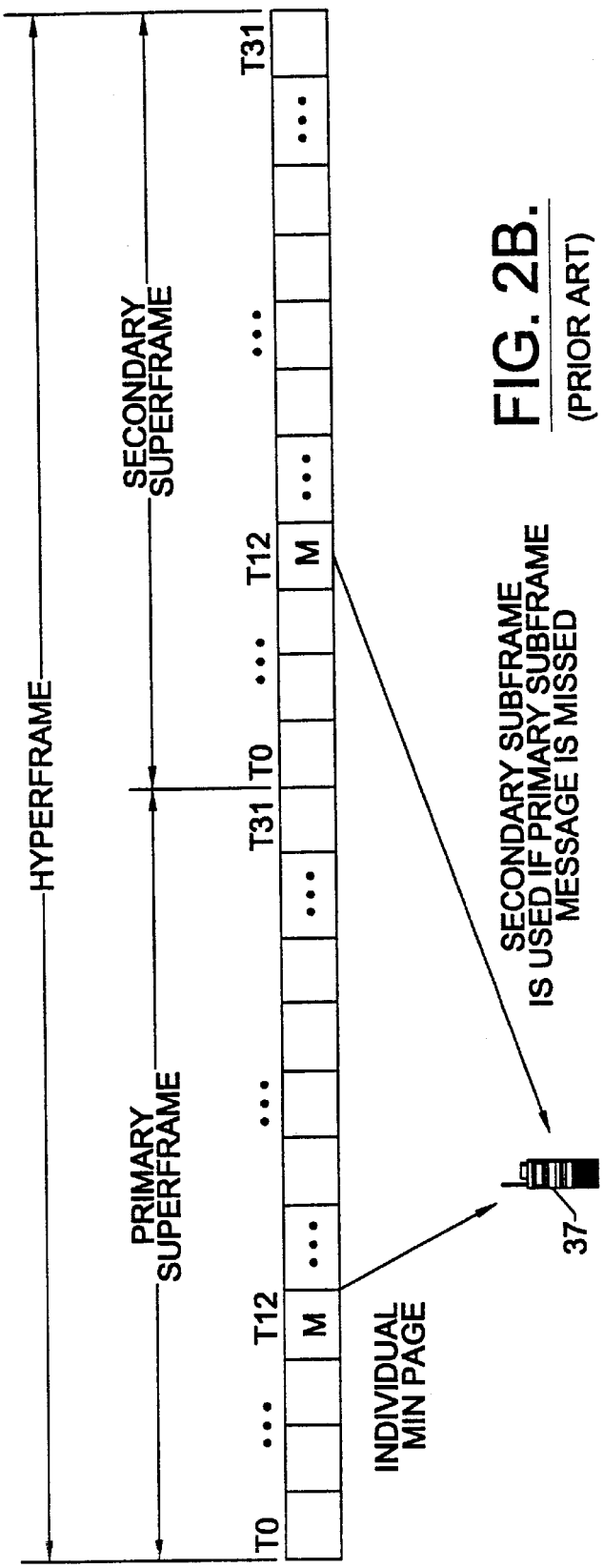
FIG. 2B is illustrates a time slot and frame structure for a digital control channel (DCCH) according to the prior system of FIG. 1.
Figure 3:
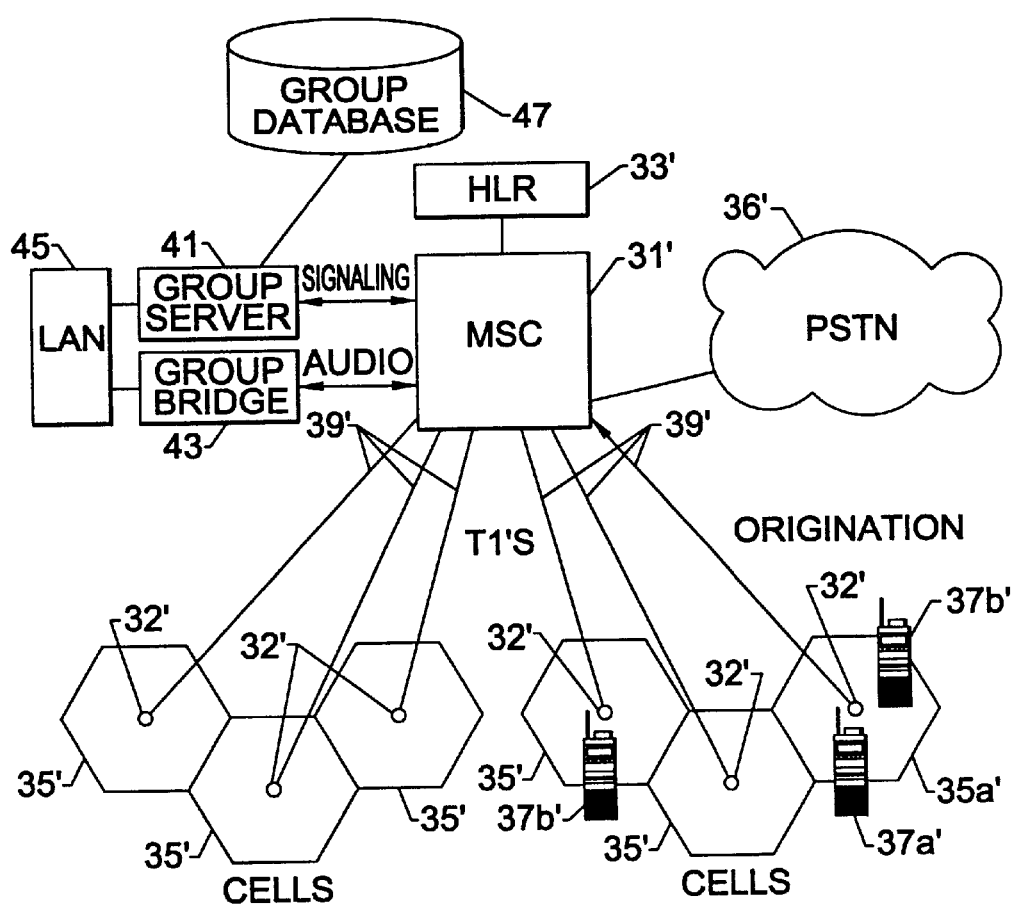
FIG. 3 is a block diagram of a cellular radiotelephone communications system with the addition of group calling functionality according to the prior art.
Figure 4:
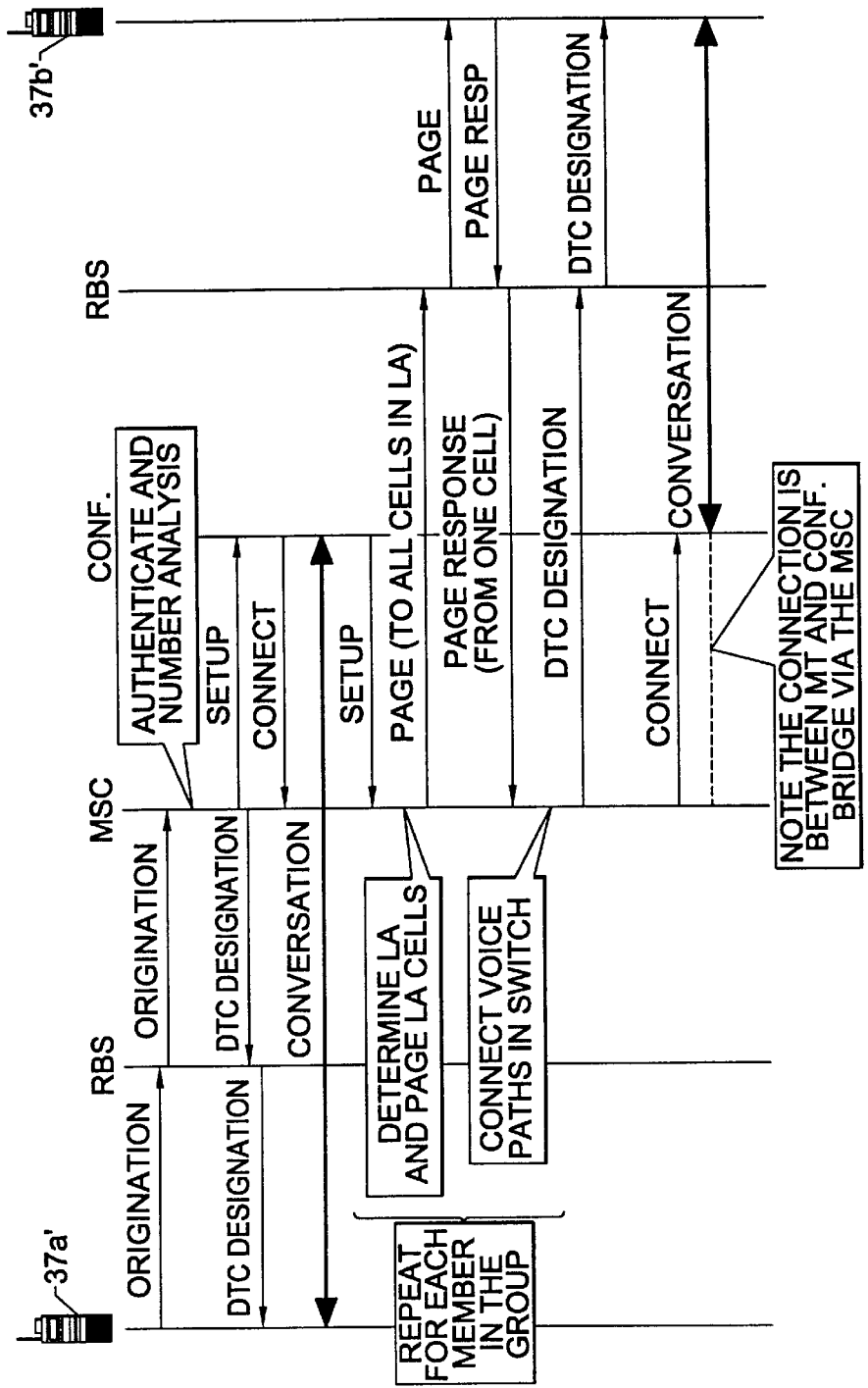
FIG. 4 is a message flow diagram illustrating steps of setting up a group radiotelephone call in the system of FIG. 3.
Figure 5:
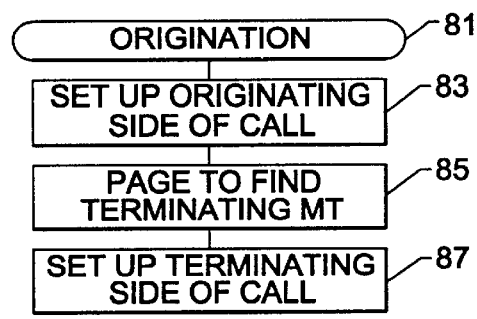
FIG. 5 is a flow diagram illustrating steps of setting up a group call according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A hybrid cellular radiotelephone communications system providing group communications according to the present invention will now be described with reference to FIGS. 6–8. In particular, the system of FIG. 6 includes a mobile switching center 131, a plurality of radio base stations defining a respective plurality of cells 132, and a home location register 133. Moreover, the mobile switching center 131 can be coupled to a public switched telephone network 136. The system of FIG. 6 can thus provide conventional one-to-one cellular radiotelephone communications according to a cellular communications standard such as the IS-136 standard.

In addition, group call functionality is provided using the group server 141, the group bridge 143, the router 153, the group database 147, the tracking database 149, and the mobile terminal parameter database 151. As shown, the mobile switching center 131 is coupled to the radio base stations 132 through communications links illustrated as solid lines. The communications links between the mobile switching center and the radio base stations (illustrated in solid lines) can be T1 links provided, for example, via landline or microwave.

Communication links are also provided between the router 153 and the radio base stations 132 as indicated by the dotted lines. In particular, the communications links between the router 153 and the radio base stations 132 can also be provided by T1 lines. As shown, the communications links between the router and the radio base stations can be provided through the mobile switching center using T1 lines, without processing these communications at the mobile switching center. This arrangement has the advantage that existing communications links (such as T1 lines) can be used thereby reducing the need for additional hardware. Alternately, communications links can be provided between the router and the radio base stations without physically passing through the mobile switching center. The communications links between the router and the radio base stations can be provided according to an existing standard such as the TCP/IP standard.

The tracking database 149 and the mobile terminal parameters database 151 are used to keep track of mobile terminal locations and parameters. In particular, each mobile terminal preferably generates a login message (transmitted over a digital control channel) whenever the mobile terminal enters a new cell and is thus serviced by a new base station or whenever the mobile terminal is turned on. The login message is received by the new servicing radio base station which then transmits the login message to the group server. The group server can thus determine which radio base station is currently serving each mobile terminal, and this information can thus be stored in the tracking database. The tracking database can thus be used to identify for each active mobile terminal the particular radio base station providing service to that mobile terminal.

Figure 7:
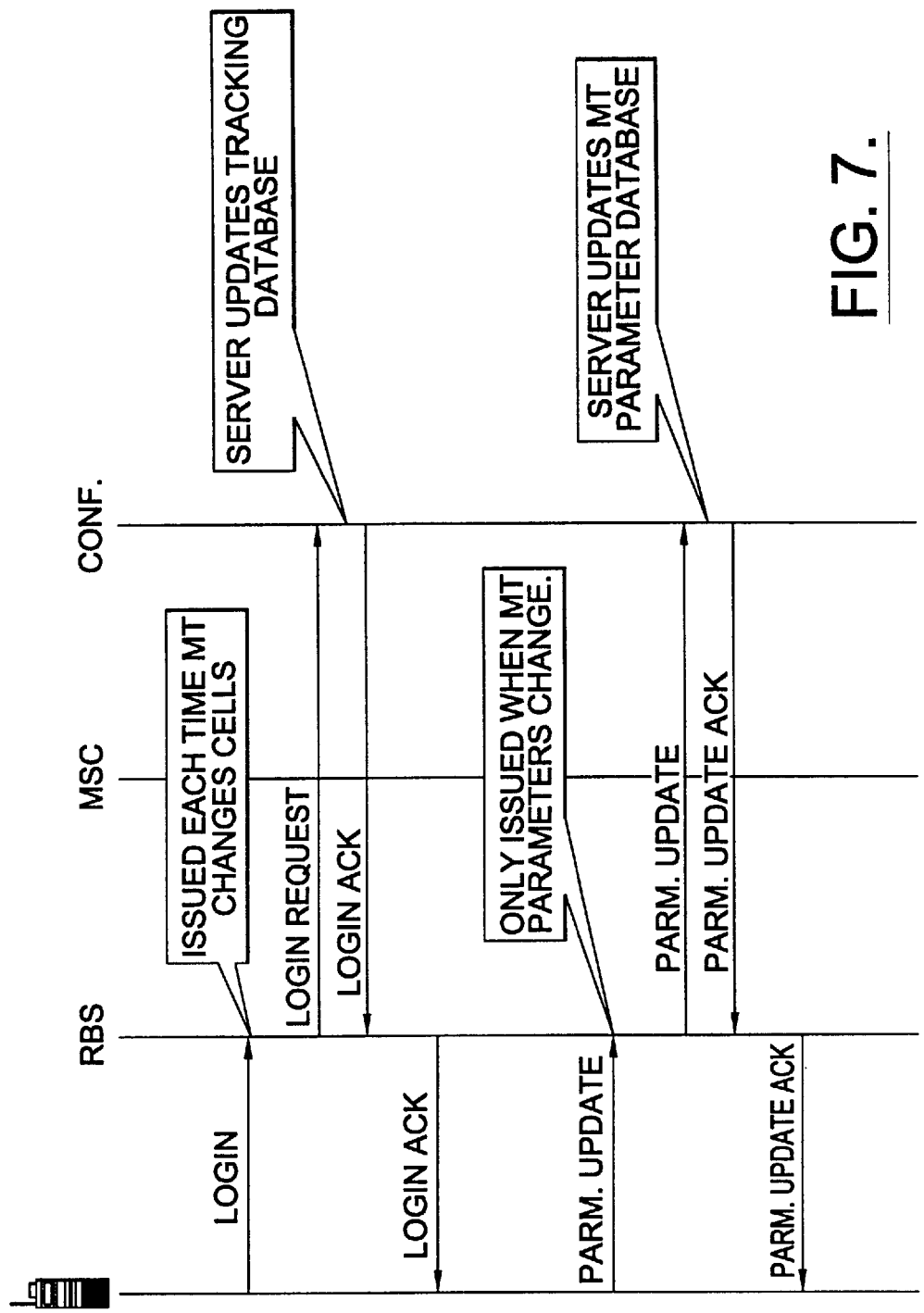
FIG. 7 is a message flow diagram illustrating steps of cell login-in according to the system of FIG. 5.

As also shown in FIG. 7, a parameter update message can be generated by the mobile terminal when the mobile terminal first enters the communications system or when parameters for the mobile terminal change. In particular, the parameter update message can include parameter information for the mobile terminal that may be different for other mobile terminals operating in the same system. For example, the parameter information can include the particular vocoder used by the terminal, and/or security information such as whether the mobile terminal supports encryption and if so the type of encryption. The parameter update message is received by the radio base station and the corresponding parameter information for the mobile terminal is stored in the mobile terminal database of the conference equipment. This information can then be used when issuing a called origination message as discussed below.

The login message can be a relatively short message transmitted within a single time slot of a single time division multiple access (TDMA) time frame so that traffic on the digital control channels is not significantly increased. The mobile terminal parameter database can be used to store mobile terminal parameters for each mobile terminal, and the mobile terminal parameters can be updated responsive to parameter update messages transmitted by the mobile terminals as discussed in greater detail below. The generation of login messages and parameter update messages is illustrated in FIG. 7.

Figure 6:
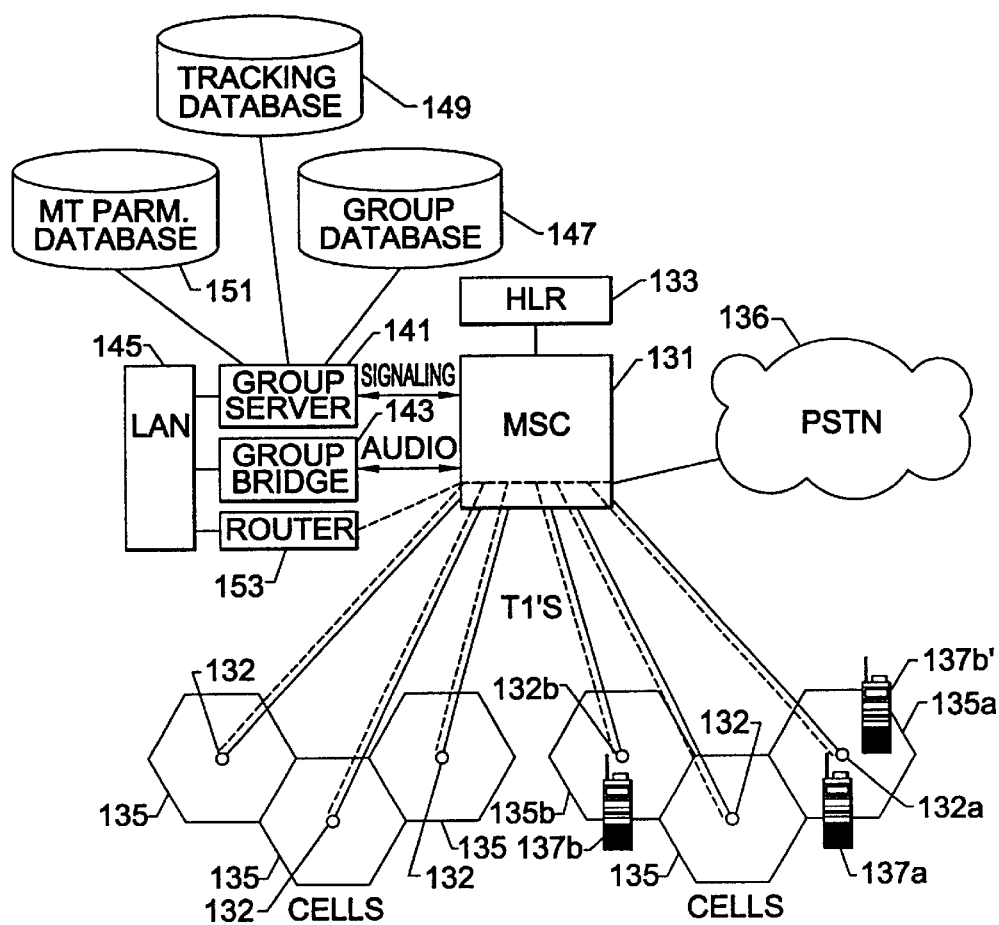
FIG. 6 is a block diagram of a cellular radiotelephone communications system including group calling functionality according to the present invention.
Figure 8:
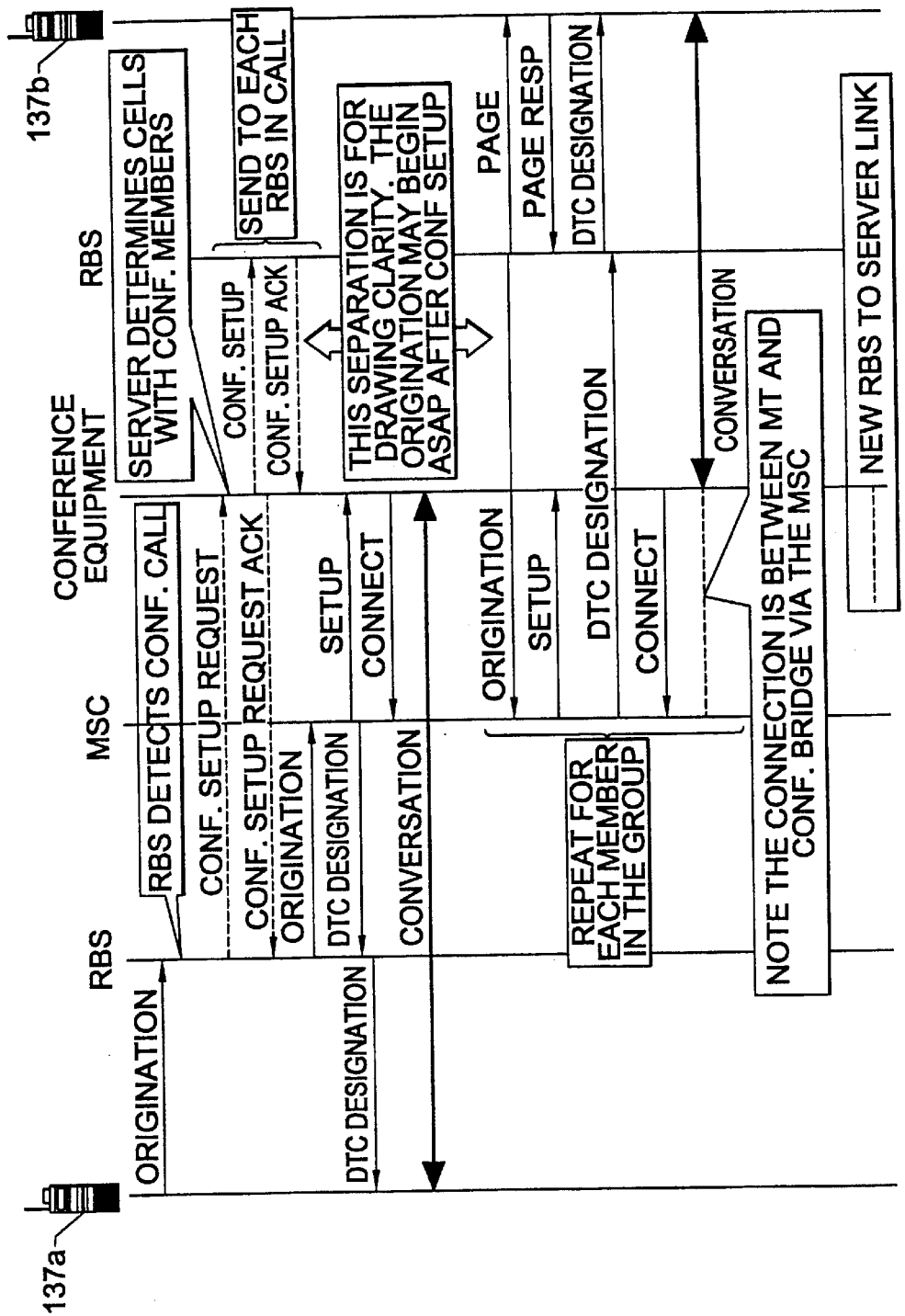
FIG. 8 is a message flow diagram illustrating steps of setting up a group radiotelephone call in the system of FIG. 5.

The setup of a group call using the system of FIG. 6 according to the present invention is illustrated in FIG. 8. In FIG. 8, the Conference Equipment includes the group server 141, group bridge 143, router 153, local area network 145, mobile terminal parameter database 151, tracking database 149, and group database 147. In particular, the originating mobile terminal 137a transmits a calling origination message that is received by the radio base station providing service to the originating mobile terminal (now referred to as the originating radio base station 132a). The information transmitted in the calling origination message can be reduced as compared to that of a conventional cellular origination message, because the parameter information for the mobile terminal is stored in mobile terminal parameter database as discussed above. By reducing the information transmitted in the calling origination message, the calling origination message can be transmitted over a single time slot thereby reducing call setup time.

The originating radio base station is able to identify a calling origination message for a group call, and thus transmits a group setup request to the group server 141. The calling origination message and the group setup request include portions thereof identifying the originating mobile terminal 137a (MIN) and the group of mobile terminals (identified by a group number) to be included in the group call. In addition, the mobile identification numbers (MINs) for each mobile terminal in the group are stored in the group database 147. The group server is thus able to identify all mobile terminals to be included in the group call (now referred to as the called mobile terminals 137b).

The server verifies that the requested group is a valid group and that the originating mobile terminal 137a is allowed to initiate calls to the requested group. After successful verification, the server 141 references the group database 147 to determine the other mobile terminals in the called group (now referred to as the called mobile terminals 137b) and their mobile identification numbers (MINs). The server also checks the tracking database to determine the radio base stations currently serving the called mobile terminals (now referred to as the called radio base stations 132b).

As shown in FIG. 6, the called mobile terminal 137b is located in the called cell 135b serviced by the called radio base station 132b. The called mobile terminal 137b', however, is in the cell 135a, serviced by the radio base station 132a. Accordingly, the radio base station 132a is both the originating radio base station and one of the called radio base stations. The radio base station 132a can thus provide all the functions discussed with reference to the originating radio base station 132a as well as the functions discussed with reference to the called radio base stations 132b. Furthermore, more than three mobile terminals can be included in the calling group, and one or more of the mobile terminals of the group can be in any of the cells of the system.

The server then issues a group setup message to the called radio base stations 132b (and 132a in this example) as well as a conference acknowledge to the originating radio base station 132a. The server 141 also notifies the group bridge 143 which call-in numbers will be used for the group call so that the bridge 143 can group the calls together. A group setup message is thus sent to respective called radio base stations providing service for each active called mobile terminal in the called group. Moreover, each group setup message can include the following information: (1) the mobile identification number for the called mobile terminal; (2) the call-in number to be called by the called radio base station providing service for the called mobile terminal; (3) the group number called by the originating mobile terminal; and (4) the mobile terminal parameter data for the called mobile terminal.

Each of the called radio base stations then issues a called origination message to the mobile switching center 131 responsive to the group setup message. Each called origination message includes the mobile identification number (MIN) for the respective called mobile terminal so that the mobile switching center believes the respective called mobile terminal issued the called origination message. The called origination message also includes the call-in number in the called party field, as well as the parameter information previously stored in the mobile terminal parameter database. This allows the call setups for both the originating mobile terminals and the called mobile terminals to proceed in parallel. This procedure also allows the mobile switching center to use its standard authentication and billing functions. In other words, each mobile terminal in the called group is treated as if it originated a call, and each mobile terminal in the called group can be billed for its own air time. In other words, by using the information for the called mobile terminal stored in the tracking database and the mobile terminal parameter database, the called radio base station is able to issue the called origination message without waiting for the called mobile terminal to respond to a page thus reducing call setup time.

After issuing a called origination message, each called radio base station transmits a group page during the next available paging subchannel of the respective digital control channel to the respective called mobile terminal using the mobile identification number specified in the respective group setup message. This group page wakes the mobile terminal to participate in the group call. The group page includes the group number in the calling party number field thus allowing the called mobile terminal to determine that the call is a group call so that the called mobile terminal can behave as if it originated a call once a digital traffic channel is assigned. Accordingly, the group paging can proceed simultaneously with other call setup activities such as the designation of a digital traffic channel by the mobile switching center.

Because the radio base station servicing each called mobile terminal is known as a result of the login message information stored in the tracking database, group setup messages can be transmitted only to radio base stations currently providing service to active mobile terminals in the group. Accordingly, the called radio base stations can transmit the respective called origination messages before receiving a page response from the respective called mobile terminal (or even before sending the page to the called mobile terminal). In other words, a called radio base station can begin setting up communications between it and the group bridge before the respective called mobile terminal has responded because it is already known that the called mobile terminal is being serviced by that base station, and because the group setup message for called mobile terminals is only sent to the radio base station(s) providing service therefor. The time required for group call setup can thus be reduced.

In addition, the originating radio base station receives a group setup request acknowledge to confirm that the group setup request was received by the group server. The group setup request acknowledge can include the mobile identification number for the originating mobile terminal, the call-in number (optional for the originating radio base station), the group number called by the originating mobile terminal, and mobile terminal parameter data (optional). The base station modifies the calling origination message received from the originating mobile terminal to include mobile terminal parameters received and replaces the called party number with the group call-in number if provided. The designation of a digital traffic channel and opening of a conversation path for the originating mobile terminal can thus be done in parallel with the designation of digital traffic channels and the opening of conversation paths for the called mobile terminals so that the time required for group call setup can be reduced. Furthermore, the group call functionality according to the present invention can be provided using cellular systems operating according to existing cellular standards such as IS-136.

Figure 9:
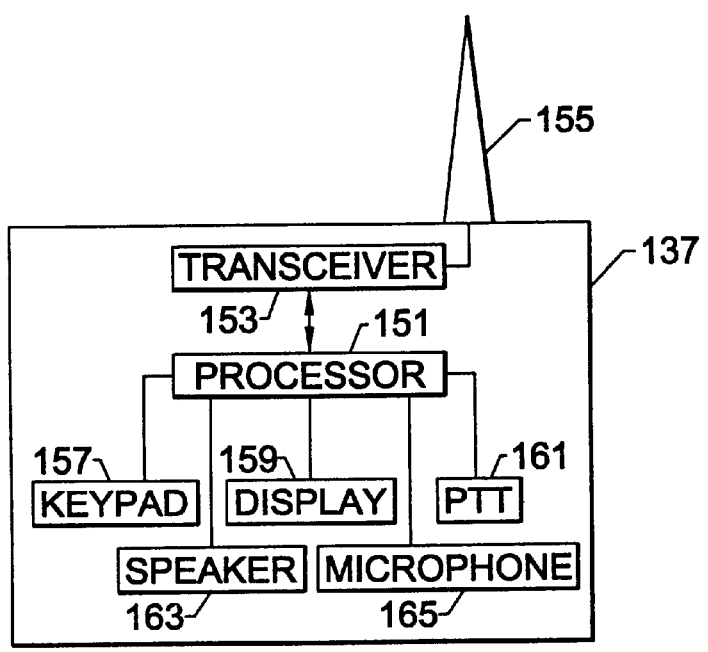
FIG. 9 is a block diagram of a mobile terminal for use with the cellular radiotelephone communications system of FIG. 6.

FIG. 9 is a block diagram of a mobile terminal 137 for use in the communications system of FIG. 6 providing both one-to-one cellular radiotelephone calls and group calls. As shown, the mobile terminal 137 includes a processor 151, a transceiver 153 (including a transmitter and a receiver), an antenna 155, a keypad 157, a display 159, a push-to-talk (PTT) button 161, a speaker 163, and a microphone 165. The mobile terminal 137 can initiate and receive one-to-one cellular radiotelephone calls according to a conventional cellular standard such as the IS-136 standard. In particular, the mobile terminal can initiate a one-to-one call responsive to the entry of a telephone number through the keypad followed by pushing a send key on the keypad. The mobile terminal can receive a one-to-one call from other terminals upon receipt of a page from the communications system causing the phone to ring wherein the user can accept the call by pressing the send key on the keypad.

The processor of the mobile terminal 137 can also be programmed to provide the group calling features discussed above with regard to the communications system of FIGS. 6, 7, and 8. In particular, the mobile terminal processor 151 can be programmed as one of a group of mobile terminals that can be included in group calls. For example, the mobile terminal processor (and the processors of other mobile terminals in the group) can be programmed with a group number identifying the group, and a group call can be initiated responsive to pressing the PTT button. When the PTT button is pushed, the mobile terminal transmits a calling origination message including the group number as discussed above thereby initiating a group call between the active mobile terminals in the group. The mobile terminal can also receive group calls as discussed above with reference to FIGS. 6–8. Moreover, the mobile terminal can transmit login messages and parameter messages as discussed above with regard to FIG. 7.

Figure 10:
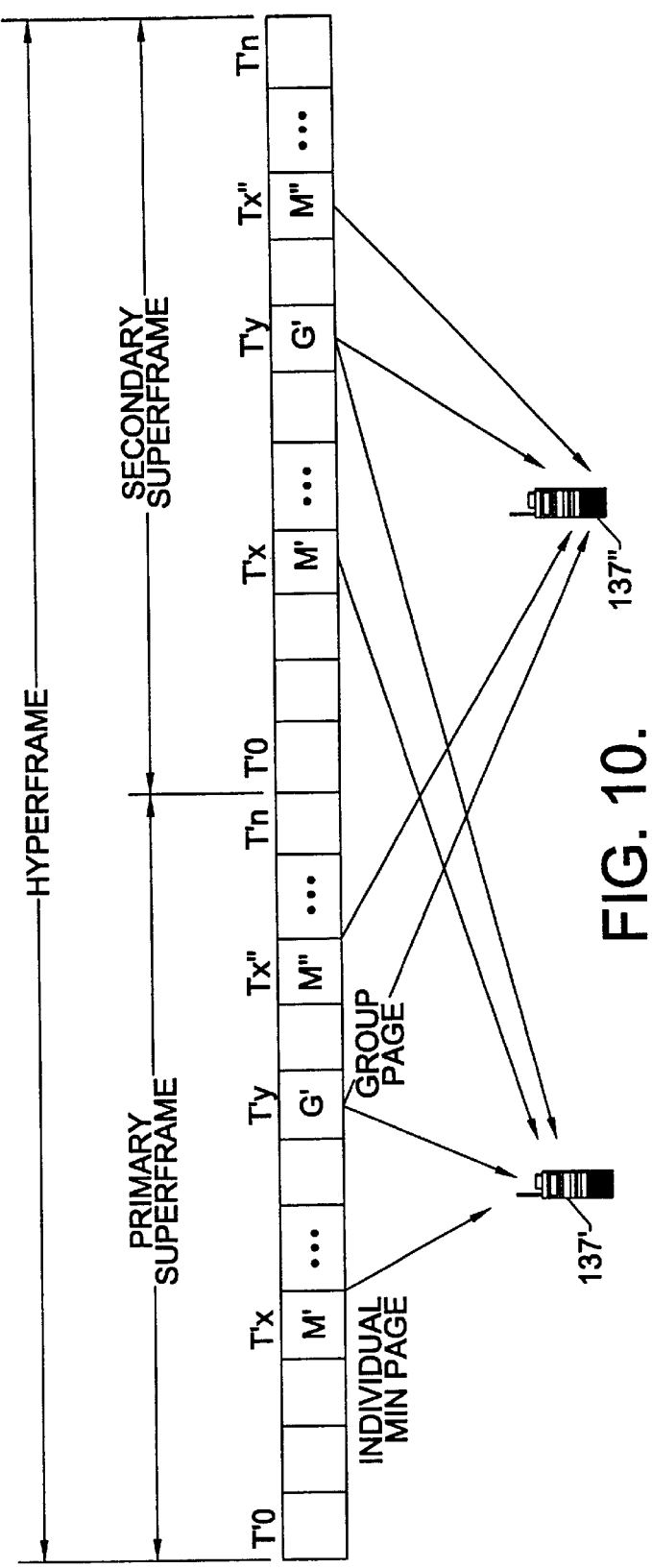
FIG. 10 illustrates the assignment of control channel time slots for individual and group pages according to the present invention.

In addition, a digital control channel (DCCH) can be used to support group and individual pages from a radio base station to a mobile terminal within a cell defined by the radio base station wherein the digital control channel includes a plurality of time slots grouped into time frames so that each time frame includes a plurality of sequential time slots. More particularly, a mobile terminal supporting group communications in the communications system of the present invention may need to receive individual pages over the digital control channel addressed only to the mobile terminal using the mobile identification number, as well as group pages addressed to a group of mobile terminals using a group identification number. Accordingly, the mobile terminal 137' may need to monitor a first time slot Tx' in each digital control channel time frame for individual pages M' addressed to the mobile identification number and a second time slot Ty' for group pages G' addressed to the group identification number as shown in FIG. 10.

The first and second control channel time slots for the mobile terminal 137' are assigned within a cell so that the mobile terminal need only monitor the two assigned time slots. The mobile terminal receiver can thus be powered down during all other time slots during each frame to reduce power consumption and increase battery life. The assignment of the two time slots, however, may require that the mobile terminal receiver be powered up during two separate (and possibly spaced apart) time slots. By assigning the second time slot Ty' to provide a desired proximity with respect to the first time slot Tx', the mobile terminal can be powered up for a period of time covering both assigned time slots of the frame and then powered down. By maintaining the desired proximity, the power consumed can be reduced because the receiver is not powered up and down twice per frame. In other words, power consumption can be reduced by powering the receiver up once over a predetermined number of time slots during a frame instead of powering the receiver up twice for two spaced apart time slots during a frame even though the predetermined number of time slots may be greater than two provided that the desired proximity is maintained.

In particular, the first time slot Tx' can be assigned to the mobile terminal 137' for individual pages M' according to a hashing algorithm based on a mobile identification number for the mobile terminal. According to the present invention, the second time slot Ty' can be assigned by the radio base station to provide group pages G' for a group of mobile terminals including the mobile terminal 137'. Preferably, the second time slot Ty' can be assigned to be. the same as the first time slot Tx' so that the mobile terminal 137' only needs to monitor one time slot. Because of paging assignments for other mobile terminals in the cell and/or other considerations at the base station, however, the radio base station 132 may be unable to assign the second time slot to be the same as the first time slot. In this situation, the radio base station 132 may attempt to assign the second time slot within a predetermined number of time slots of the first time slot. For example, the predetermined number of time slots may be five such the radio base station attempts to assign the second time slot to be spaced no more than five time slots from the first time slot with the second time slot being assigned preferably as close to the first time slot as possible. For example, the radio base station will attempt to assign the second time slot adjacent to the first time slot before providing a greater separation of the time slots.

In the event that the second time slot cannot be assigned within the predetermined number of time slots of the first time slot, it may be advantageous to provide a separation between the two time slots for the mobile terminal so that the mobile terminal receiver has time to power down and then up again between the two time slots and/or to reduce power consumption as compared to leaving the receiver powered up for longer than the predetermined number of time slots. For example, if the first and second time slots cannot be assigned within five time slots of each other, it may be desirable to separate the first and second time slots by at least eight time slots.

As will be understood, the terms first and second are used to identify time slots for group and individual pages for a mobile terminal within a control channel frame without limiting the order of the time slots. For example, the first time slot can follow the second time slot in a frame of time slots. Moreover, the first and second time slots can be assigned according to the following order of preference: (1) such that the two time slots are the same time slot; (2) such that the two time slots are sequential with no intervening time slots therebetween; (3) such that the two time slots are separated by up to the predetermined number of intervening time slots thus maintaining the desired proximity; and (4) such that the two time slots are separated by a sufficient number of time slots greater than the predetermined number so that the mobile terminal receiver can be powered down and then up again between the two time slots.

Because time slots for paging channels for a mobile terminal are determined by the radio base station, the time slot assignments are preferably initiated responsive to receipt at the radio base station (RBS) of the login message from the mobile terminal as shown in FIG. 7. As discussed above, the mobile terminal transmits the login message to the radio base station when the mobile terminal moves into the cell serviced by the radio base station. On receipt of the login message, the radio base station can assign control channel time slots for the mobile terminal as discussed above, and one or both of the assigned time slots can be communicated to the mobile terminal in the login acknowledge message transmitted by the radio base station.

The login message can also be used to transmit assignment priority information for the mobile terminal. Assignment priority information for the mobile terminal can include a battery charge indication and/or a preferred status indication (for example, a police or fire department terminal indication). Accordingly, a mobile terminal with a low battery charge can be given higher time slot assignment priority than a mobile terminal with a high battery charge, and/or a police department terminal can be given a higher time slot assignment priority than a non-police terminal. The greatest reductions in power consumption and battery drain can thus be provided for the mobile terminals with the highest assignment priorities.

The assignment priority information can be used, for example, in the event that two mobile terminals belonging to the same call group are present in a common cell. In this situation, the radio base station will assign first and second time slots Tx' and Ty' to the first mobile terminal 137' to move into the cell as discussed above. When the second terminal 137" from the group moves into the cell, however, the second time slot Ty' will have already been assigned for group pages to mobile terminals belonging to that group in that cell. Because of the previous assignment of the second time slot Ty' for group pages for that group in that cell, it may be difficult to provide the desired proximity of time slots for the second mobile terminal 137". For example, if the time slot Tx" for individual pages M" to the second mobile terminal 137" is assigned according to a hashing algorithm based on a mobile identification number for the second mobile terminal 137", and the time slot Ty' for group pages G' has been assigned previously, the radio base station may not be able to provide the desired proximity of paging channel time slots for the second mobile terminal.

This situation can be addressed by comparing the assignment priority information for the two mobile terminals 137' and 137". If the first mobile terminal 137' has a higher assignment priority, the previous assignment of group pages G' to the time slot Ty' can be maintained. If the second mobile terminal 137" has a higher assignment priority, the radio base station can reassign the group pages G' to a new time slot to provide the desired proximity of time slots for the second mobile terminal. For example, the radio base station can reassign the group pages to a new time slot if the second mobile terminal has a lower battery charge than the first mobile terminal so that the power consumed by the second mobile terminal can be reduced.

This situation can alternately be addressed by allowing the radio base station to independently assign the time slots for individual pages to mobile terminals providing group communications as opposed to using the hashing algorithm. Accordingly, the first mobile terminal 137' of a group to enter a cell can be assigned the first time slot Tx' for individual pages M' and the second time slot Ty' for group pages G' to provide the desired proximity where the first time slot is not constrained by the fixed hashing algorithm. When the second mobile terminal 137" of the group enters the cell, the radio base station can assign a third time slot Tx" for individual pages M" to the second mobile terminal to provide the desired proximity with respect to the second time slot Ty'.

When assigning the third time slot Tx", the radio base station can also reassign the first and second time slots Tx' and Ty' to increase the proximity of the three time slots. Preferably, the radio base station can assign first time slot Tx', the second time slot Ty', and the third time slot Tx" to be the same so that the first and second mobile terminals need only monitor a single time slot for any frame of the digital control channel for individual and group pages. The time slots Tx', Ty', and Tx" can be reassigned yet again upon entry of additional mobile terminals of the group into the cell according to the relative assignment priorities of the mobile terminals in the group and other traffic on the digital control channel.

Figure 11:
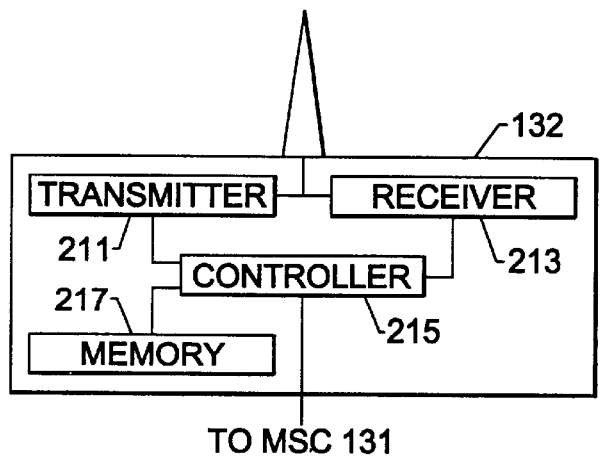
FIG. 11 is a block diagram illustrating a radio base station according to the present invention.

A radio base 132 station according to the present invention is illustrated in FIG. 11. As shown, the radio base station 132 includes a transmitter 211, a receiver 213, a controller 215, and memory 217. The transmitter transmits radio communications to mobile terminals in the cell defined by the radio base station, the receiver receives radio communications from mobile terminals in the cell, and the controller controls the operation of the two. The controller also transmits and receives communications to and from the mobile switching center (MSC) 131. In particular, the controller assigns the time slots for individual and group pages for each mobile terminal in the cell responsive to receipt of the login message through the receiver. The time slot assignments are performed by the controller as discussed above, and then transmitted to the respective mobile terminal through the transmitter 211.

Figure 12:
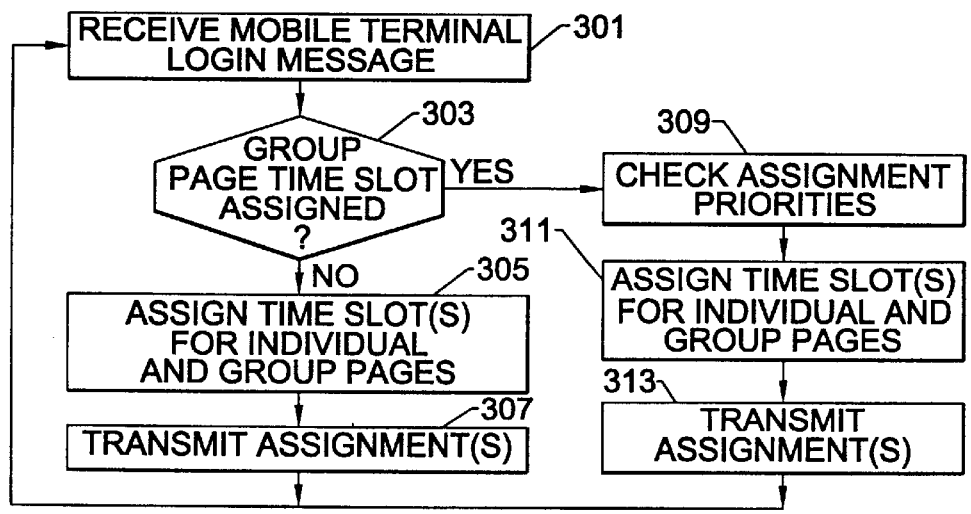
FIG. 12 is a flow chart illustrating operations of assigning control channel time slots for individual and group pages according to the present invention.

Operations and methods according to the present invention are illustrated in the flow chart of FIG. 12. As shown, when the radio base station receives a login message from a mobile terminal providing group communications at block 301, the radio base station controller determines whether a control channel time slot has already been assigned for group pages for the group to which the mobile terminal belongs at block 303. If a control channel has not been previously assigned for group pages, the radio base station assigns a first time slot for individual pages for the mobile terminal and a second time slot for group pages to mobile terminals in the group at block 305.

The first and second time slots are preferably assigned to provide a desired proximity therebetween, and most preferably assigned to be the same. If the desired proximity can not feasibly be provided, the radio base station may provide a separation of the first and second time slots greater than the desired proximity to allow the mobile terminal receiver to be powered down and then up again between the first and second time slots. The assignment of time slots is discussed in greater detail above. The time slot assignments are then transmitted to the mobile terminal through the radio base station transmitter at block 307.

If a control channel has been previously assigned for group pages for the group to which the mobile terminal belongs, the radio base station can check the assignment priorities for all mobile terminals in the cell belonging to the group at block 309. Time slots for individual and group pages are then assigned for the mobile terminal which transmitted the login message at block 311 according to the assignment priorities for the mobile terminals in the group. This step can also include reassigning the time slot for group pages and/or reassigning time slots for individual pages for other mobile terminals of the group in the cell. Accordingly, time slots for individual and group pages for all mobile terminals of a group in a cell can be assigned to reduce power consumption at individual mobile terminals, and the assignment priority information can be used to provide the greatest reductions in power consumption at the mobile terminals with the highest assignment priorities. The new time slot assignments are then transmitted to the respective mobile terminals at block 313.

The flowchart of FIG. 12 illustrates exemplary operations for assigning control channel time slots for group and individual pages according to aspects of the present invention. It will be understood that blocks of the flowchart of FIG. 12, and combinations of blocks in the flowchart, can be implemented by computer program instructions which may be loaded onto a computer or other programmable data processing apparatus, such as the controller 215 of the radio base station 132 of FIG. 11 to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart of FIG. 12 support combinations of means for performing the specified functions and combinations of steps for performing the specified functions. It will also be understood that each block of the flowchart of FIG. 12, and combinations of blocks therein, can be implemented by special purpose hardware-based computer systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of assigning paging channels to terminals providing group communications with a communications systems, the method comprising the steps of:

defining a control channel including a plurality of time slots wherein the time slots are grouped into time frames so that each time frame includes a plurality of sequential time slots;

assigning a first time slot of each of the time frames as a first paging channel for one of the terminals; and assigning a second time slot of each of the time frames as a second paging channel for the terminal wherein the second time slot is assigned to provide a desired proximity of the first and second time slots within each of the time frames and wherein assigning the second time slot comprises, determining whether the second time slot can be provided within a predetermined number of time slots of the first time slot, and responsive to determining that the second time slot can be provided within the predetermined number of time slots of the first time slot, assigning the second time slot within the predetermined number of time slots of the first time slot within each of the time frames.

2. A method according to claim 1 wherein the step of assigning the second time slot further comprises:

responsive to determining that the second time slot cannot be provided within the predetermined number of time slots of the first time slot, assigning the second time slot so that at least a second predetermined number of time slots separates the first and second time slots within a time frame wherein the second predetermined number of time slots is greater than the first predetermined number of time slots.

3. A method according to claim 1 wherein the control channel comprises a digital control channel.

4. A method according to claim 1 wherein first and second consecutive time frames define respective primary and secondary frames such that information included in the secondary frame is the same as information included in the primary frame.

5. A method according to claim 1 wherein the first paging channel for the terminal comprises an individual paging channel for the terminal and wherein the second paging channel comprises a group paging channel for the terminal.

6. A method according to claim 5 wherein the step of assigning the first time slot as a first individual paging channel for the terminal comprises assigning the first time slot based on an identification number (MIN) for the terminal.

7. A method according to claim 6 wherein the first time slot is assigned according to a hashing algorithm.

8. A method of assigning paging channels to terminals providing group communications with a communications systems, the method comprising the steps of:

defining a control channel including a plurality of time slots wherein the time slots are grouped into time frames so that each time frame includes a plurality of sequential time slots;

assigning a first time slot of each of the time frames as a first paging channel for one of the terminals;

assigning a second time slot of each of the time frames as a second paging channel for the terminal wherein the second time slot is assigned to provide a desired proximity of the first and second time slots within each of the time frames;

assigning a third time slot of each of the time frames as a third paging channel for a second one of the terminals; and assigning a fourth time slot of each of the time frames as a fourth paging channel for the second terminal wherein the fourth time slot is assigned to provide a desired proximity of the third and fourth time slots within each of the time frames.

9. A method according to claim 8 wherein the steps of assigning the first, second, third, and fourth time slots are preceded by the step of:

assigning relative high and low priorities to the first and second terminals respectively so that the desired proximity of the first and second time slots is given higher priority than the desired proximity of the third and fourth time slots.

10. A method according to claim 9 wherein the relative high priority is assigned to the first terminal having a battery charge lower than that of the second terminal.

11. A method according to claim 9 wherein the relative high priority is assigned to the first terminal having a preferred status with respect to the second terminal.

12. A method according to claim 8 wherein the first and second terminals provide group communications therebetween and wherein the second and fourth time slots comprise a common time slot so that the second and fourth paging channels comprises a common group paging channel, the method further comprising the step of:

assigning relative high and low priorities to the first and second terminals so that the desired proximity of the first time slot and the common time slot is given higher priority than the desired proximity of the third time slot and common time slot.

13. A method of assigning paging channels to terminals providing group communications with a communications systems, the method comprising the steps of:

defining a control channel including a plurality of time slots wherein the time slots are grouped into time frames so that each time frame includes a plurality of sequential time slots;

communicating a login message from the terminal to the communications system;

after communicating the login message, assigning a first time slot of each of the time frames as a first paging channel for one of the terminals;

after communicating the login message, assigning a second time slot of each of the time frames as a second paging channel for the terminal wherein the second time slot is assigned to provide a desired proximity of the first and second time slots within each of the time frames; and after assigning the first and second time slots, communicating at least one of the first time slot assigned as the first paging channel and the second time slot assigned as the second paging channel from the communications system to the terminal.

14. A communications system providing group communications with terminals, the communications system comprising:

a transmitter which transmits radio communications to terminals within a cell defined by the communications system;

a receiver which receives radio communication from terminals within the cell; and a controller coupled to the transmitter and receiver wherein the controller generates a control channel transmitted by the transmitter, the control channel including a plurality of time slots grouped into time frames so that each time frame includes a plurality of sequential time slots, wherein a first time slot of each of the time frames is assigned as a first paging channel for one of the terminals, wherein a second time slot of each of the time frames is assigned as a second paging channel for the terminal, wherein the second time slot is assigned to provide a desired proximity of the first and second time slots within each of the time frames and wherein the controller determines whether the second time slot can be provided within a predetermined number of time slots of the first time slot, and wherein responsive to determining that the second time slot can be provided within the predetermined number of time slots of the first time slot, the second time slot is assigned within the predetermined number of time slots of the first time slot within each of the time frames.

15. A communications system according to claim 14 wherein responsive to determining that the second time slot cannot be provided within the predetermined number of time slots of the first time slot, the second time slot is assigned so that at least a second predetermined number of time slots separates the first and second time slots within a time frame wherein the second predetermined number of time slots is greater than the first predetermined number of time slots.

16. A communications system providing group communications with terminals, the communications system comprising:

a transmitter which transmits radio communications to terminals within a cell defined by the communications system;

a receiver which receives radio communication from terminals within the cell; and a controller coupled to the transmitter and receiver wherein the controller generates a control channel transmitted by the transmitter, the control channel including a plurality of time slots grouped into time frames so that each time frame includes a plurality of sequential time slots, wherein a first time slot of each of the time frames is assigned as a first paging channel for one of the terminals, wherein a second time slot of each of the time frames is assigned as a second paging channel for the terminal wherein the second time slot is assigned to provide a desired proximity of the first and second time slots within each of the time frames, wherein a third time slot of each of the time frames is assigned as a third paging channel for a second one of the terminals, and wherein a fourth time slot of each of the time frames is assigned as a fourth paging channel for the second terminal wherein the fourth time slot is assigned to provide a desired proximity of the third and fourth time slots within each of the time frames.

17. A communications system according to claim 16 wherein relative high and low priorities are assigned to the first and second terminals respectively so that the desired proximity of the first and second time slots is given higher priority than the desired proximity of the third and fourth time slots.

18. A communications system according to claim 17 wherein the relative high priority is assigned to the first terminal having a battery charge lower than that of the second terminal.

19. A communications system according to claim 17 wherein the relative high priority is assigned to the first terminal having a preferred status with respect to the second terminal.

20. A communications system according to claim 16 wherein the first and second terminals provide group communications therebetween and wherein the second and fourth time slots comprise a common time slot so that the second and fourth paging channels comprises a common group paging channel, wherein relative high and low priorities are assigned to the first and second terminals so that the desired proximity of the first time slot and the common time slot is given higher priority than the desired proximity of the third time slot and common time slot.

21. A communications system according to claim 14 wherein the control channel comprises a digital control channel.

22. A communications system according to claim 14 wherein first and second consecutive time frames define respective primary and secondary frames such that information included in the secondary frame is the same as information included in the primary frame.

23. A communications system according to claim 14 wherein the first paging channel for the terminal comprises an individual paging channel for the terminal and wherein the second paging channel comprises a group paging channel for the terminal.

24. A communications system according to claim 23 wherein the first time slot is assigned based on an identification number for the terminal.

25. A communications system according to claim 24 wherein the first time slot is assigned according to a hashing algorithm based on the mobile identification number.

26. A communications system providing group communications with terminals, the communications system comprising:

a transmitter which transmits radio communications to terminals within a cell defined by the communications system;

a receiver which receives radio communication from terminals within the cell; and a controller coupled to the transmitter and receiver wherein the controller generates a control channel transmitted by the transmitter, the control channel including a plurality of time slots grouped into time frames so that each time frame includes a plurality of sequential time slots, wherein a first time slot of each of the time frames is assigned as a first paging channel for one of the terminals, and wherein a second time slot of each of the time frames is assigned as a second paging channel for the terminal wherein the second time slot is assigned to provide a desired proximity of the first and second time slots within each of the time frames;

wherein before assigning the first and second time slots, the receiver receives a login message from the terminal, and wherein after assigning the first and second time slots, the transmitter transmits at least one of the first time slot assigned as the first paging channel and the second time slot assigned as the second paging channel to the terminal.

27. A communications system according to claim 14 wherein the transmitter, receiver, and controller are provided within a first radio base station of the communications system, the communications system further comprising;

a switching center coupled to the controller; and a second radio base station coupled to the switching center.

28. A terminal providing group communications within a communications system including at least one radio base station defining a cell, the terminal comprising:

a transmitter which transmits radio communications to the communications system wherein the transmitter transmits a login message to the radio base station;

a receiver which receives radio communications from the communications system wherein the receiver receives a time division multiple access control channel transmitted by the communications system, the time division multiple access control channel including a plurality of time slots grouped into time frames so that each time frame includes a plurality of sequential time slots wherein the receiver receives a paging assignment from the radio base station assigning a first time slot of each of the time frames of the control channel as a group paging channel for the terminal and assigning a second time slot of each of the time frames of the control channel as a second paging channel for the terminal wherein assigning the second time slot comprises, determining whether the second time slot can be provided within a predetermined number of time slots of the first time slot, and responsive to determining that the second time slot can be provided within the predetermined number of time slots of the first time slot, assigning the second time slot within the predetermined number of time slots of the first time slot within each of the time frames; and a processor coupled to the transmitter and receiver wherein the processor activates the receiver during the first assigned time slot of each time frame to determine if a group page for the terminal has been transmitted by the radio base station.

29. A terminal according to claim 28 wherein the second time slot of each of the times frames of the control channel is assigned as an individual paging channel for the terminal wherein the processor activates the receiver during the second assigned time slot of each time frame to determine if an individual page for the terminal has been transmitted by the radio base station.

30. A terminal according to claim 29 wherein the assignment of the second time slot of each of the time frames of the control channel is determined by the processor using an identification number for the terminal.

31. A terminal according to claim 29 wherein the assignment of the second time slot of each of the time frames of the control channel is determined by the processor according to a hashing algorithm.

32. A terminal according to claim 28 wherein the login message includes group channel paging assignment priority information for the terminal.

33. A terminal according to claim 32 wherein the group channel paging assignment priority information includes a battery charge indication.

34. A terminal according to claim 32 wherein the group channel paging assignment priority information includes a preferred status indication.

35. A terminal according to claim 28 wherein the control channel comprises a digital control channel.

36. A terminal according to claim 28 wherein first and second consecutive time frames define respective primary and secondary frames such that information included in the secondary frame is the same as information included in the primary frame.

37. A communications system providing group communications with terminals, the communications system comprising:
   a transmitter which transmits radio communications to one of the terminals within a cell defined by the communications system wherein the transmitter transmits a control channel including a plurality of time slots grouped into time frames so that each time frame includes a plurality of sequential time slots;
   a receiver which receives radio communications from the terminals within the cell wherein the receiver receives a login message from the terminal; and
   a controller coupled to the receiver wherein the controller performs a paging assignment assigning a first time slot of each of the time frames of the control channel as a group paging channel for the terminal and assigning a second time slot of each of the time frames of the control channel as a second paging channel for the terminal responsive to the login message, wherein the paging assignment is transmitted to the terminal through the transmitter, and wherein assigning the second time slot comprises,
      determining whether the second time slot can be provided within a predetermined number of time slots of the first time slot, and
      responsive to determining that the second time slot can be provided within the predetermined number of time slots of the first time slot, assigning the second time slot within the predetermined number of time slots of the first time slot within each of the time frames.

38. A communications system according to claim 37 wherein the second time slot of each of the times frames of the control channel is assigned as an individual paging channel for the terminal.

39. A communications system according to claim 38 wherein the first time slot is assigned to provide a desired proximity of the first and second time slots within each of the time frames.

40. A communications system according to claim 38 wherein the assignment of the second time slot of each of the time frames of the control channel is determined by the controller using an identification number for the terminal.

41. A communications system according to claim 37 wherein the login message includes group channel paging assignment priority information for the terminal.

42. A communications system according to claim 41 wherein the group channel paging assignment priority information includes a battery charge indication for the terminal.

43. A communications system according to claim 41 wherein the group channel paging assignment priority information includes a preferred status indication for the terminal.

44. A communications system according to claim 37 wherein the control channel comprises a digital control channel.

45. A communications system according to claim 37 wherein first and second consecutive time frames define respective primary and secondary frames such that information included in the secondary frame is the same as information included in the primary frame.

46. A communications system providing group communications with terminals, the communications system comprising:
   a transmitter which transmits radio communications to one of the terminals within a cell defined by the communications system wherein the transmitter transmits a control channel including a plurality of time slots grouped into time frames so that each time frame includes a plurality of sequential time slots;
   a receiver which receives radio communications from the terminals within the cell wherein the receiver receives a login message from the terminal; and
   a controller coupled to the receiver wherein the controller performs a group channel paging assignment assigning a time slot of each of the time frames of the control channel as a group paging channel for the terminal responsive to the login message wherein the group channel paging assignment is transmitted to the terminal through the transmitter;
   wherein a second time slot of each of the times frames of the control channel is assigned as an individual paging channel for the terminal; and
   wherein the assignment of the second time slot of each of the time frames of the control channel is determined by the controller according to a hashing algorithm.

47. A method of providing group communications for a terminal within a communications system including at least one radio base station defining a cell, the method comprising the steps of:
   defining a control channel transmitted by the communications system, the control channel including a plurality of time slots grouped into time frames so that each time frame includes a plurality of sequential time slots;
   transmitting a login message to the radio base station;
   receiving a group channel paging assignment from the radio base station assigning a first time slot of each of the time frames of the control channel as a group paging channel for the terminal;
   assigning a second time slot of each of the time frames of the control channel as an individual paging channel for the terminal wherein assigning the second time slot comprises,
      determining whether the second time slot can be provided within a predetermined number of time slots of the first time slot, and
      responsive to determining that the second time slot can be provided within the predetermined number of time slots of the first time slot, assigning the second time slot within the predetermined number of time slots of the first time slot within each of the time frames;
   monitoring the first assigned time slot of each time frame to determine if a group page for the terminal has been transmitted by the radio base station; and monitoring the second assigned time slot of each time frame to determine if an individual page for the terminal has been transmitted by the radio base station.

48. A method according to claim 47 wherein the assignment of the second time slot of each of the time frames of the control channel is determined using a mobile identification number for the terminal.

49. A method according to claim 47 wherein the assignment of the second time slot of each of the time frames of the control channel is determined according to a hashing algorithm.

50. A method according to claim 47 wherein the login message includes group channel paging assignment priority information for the terminal.

51. A method according to claim 50 wherein the group channel paging assignment priority information includes a battery charge indication.

52. A method according to claim 50 wherein the group channel paging assignment priority information includes a preferred status indication.

53. A method according to claim 47 wherein the control channel comprises a digital control channel.

54. A method according to claim 47 wherein first and second consecutive time frames define respective primary and secondary frames such that information included in the secondary frame is the same as information included in the primary frame.

55. A method for providing group communications with terminals, the communications system comprising:
   transmitting radio control channel including a plurality of time slots grouped into time frames so that each time frame includes a plurality of sequential time slots;
   receiving a login message from a terminal;
   assigning a first time slot of each of the time frames of the control channel as a group paging channel for the terminal responsive to the login message;
   assigning a second time slot of each of the times frames of the control channel as an individual paging channel for the terminal wherein assigning the second time slot comprises,
      determining whether the second time slot can be provided within a predetermined number of time slots of the first time slot, and
      responsive to determining that the second time slot can be provided within the predetermined number of time slots of the first time slot, assigning the second time slot within the predetermined number of time slots of the first time slot within each of the time frames; and
   transmitting the paging assignments to the terminal.

56. A method according to claim 55 wherein the first time slot is assigned to provide a desired proximity of the first and second time slots within each of the time frames.

57. A method according to claim 56 wherein the assignment of the second time slot of each of the time frames of the control channel is determined using a mobile identification number for the terminal.

58. A method according to claim 55 wherein the login message includes group channel paging assignment priority information for the terminal.

59. A method according to claim 58 wherein the group channel paging assignment priority information includes a battery charge indication for the terminal.

60. A method according to claim 58 wherein the group channel paging assignment priority information includes a preferred status indication for the terminal.

61. A method according to claim 55 wherein the control channel comprises a digital control channel.

62. A method according to claim 55 wherein first and second consecutive time frames define respective primary and secondary frames such that information included in the secondary frame is the same as information included in the primary frame.

63. A method for providing group communications with terminals, the communications system comprising:
   transmitting radio control channel including a plurality of time slots grouped into time frames so that each time frame includes a plurality of sequential time slots;
   receiving a login message from a terminal; and
   assigning one time slot of each of the time frames of the control channel as a group paging channel for the terminal responsive to the login message; and
   transmitting the group channel paging assignment to the terminal;
   assigning a second time slot of each of the times frames of the control channel as an individual paging channel for the terminal;
   wherein the first time slot is assigned to provide a desired proximity of the first and second time slots within each of the time frames;
   wherein the assignment of the second time slot of each of the time frames of the control channel is determined at the communications system according to a hashing algorithm.

* * * * *